United States Patent
Silvasi et al.

(10) Patent No.: US 6,538,427 B1
(45) Date of Patent: Mar. 25, 2003

(54) VEHICLE WHEEL SPEED SENSOR AND BEARING ASSEMBLY HAVING SPEED SENSOR SECURED TO WHEEL SPINDLE

(75) Inventors: Michael L. Silvasi, Dexter, MI (US); Jason D. Turner, Dearborn Heights, MI (US); Thomas L. Minneker, Brighton, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 09/822,848

(22) Filed: Mar. 30, 2001

(51) Int. Cl.[7] ............................. G01P 3/44; F16C 19/00
(52) U.S. Cl. ................... 324/174; 324/207.25; 384/448
(58) Field of Search .................. 324/174, 173, 324/207.25, 207.22; 384/448

(56) References Cited

U.S. PATENT DOCUMENTS

| | | | |
|---|---|---|---|
| 5,184,069 A | * 2/1993 | Adler et al. | ................. 324/174 |
| 5,470,157 A | 11/1995 | Dougherty et al. | |
| 5,564,839 A | 10/1996 | Ouchi et al. | |
| 5,816,711 A | 10/1998 | Gingrich | |
| 5,852,361 A | 12/1998 | Ouchi et al. | |
| 5,920,193 A | 7/1999 | Tola et al. | |
| 5,938,346 A | 8/1999 | Ouchi | |
| 5,997,182 A | 12/1999 | Brown | |
| 6,036,370 A | 3/2000 | Kessen et al. | |
| 6,045,267 A | 4/2000 | Merklein et al. | |

FOREIGN PATENT DOCUMENTS

EP 0930505 7/1999

* cited by examiner

*Primary Examiner*—Walter E. Snow
(74) *Attorney, Agent, or Firm*—MacMillan Sobanski & Todd, LLC

(57) ABSTRACT

A wheel speed sensor and bearing assembly for use in a wheel end assembly of a vehicle. The assembly includes an outer race, an inner race, a bearing unit, a spindle, a wheel speed sensor and a tone wheel. The outer race includes an opened inboard end, an opened outboard end, and at least one bearing seat. The inner race includes at least one bearing seat. The bearing unit is disposed between the bearing seats of the outer race and inner race. The spindle is adapted to be secured to a fixed component of the vehicle and includes an inboard end, an outboard end, and an opening formed therethrough. The wheel speed sensor is operatively connected to the spindle adjacent the outboard end thereof. The wheel speed sensor includes an outer magnet surface. The tone wheel is operatively secured to the outer race adjacent the opened outboard end thereof. The tone wheel includes an inner surface which is positioned in a spaced apart relationship relative to the outer magnet surface of the wheel speed sensor.

20 Claims, 2 Drawing Sheets

VEHICLE WHEEL SPEED SENSOR AND BEARING ASSEMBLY HAVING SPEED SENSOR SECURED TO WHEEL SPINDLE

BACKGROUND OF THE INVENTION

The subject invention relates to in general to vehicle wheel end assemblies and in particular to an improved wheel speed sensor and bearing assembly for use in such a vehicle wheel end assembly.

A conventional wheel speed sensor and bearing assembly for use in a wheel end assembly of a front drive vehicle includes a bearing unit, a wheel spindle, and a wheel speed sensor assembly. The bearing unit typically includes a non-rotatable outer race, a rotatable inner race, and a pair of bearings disposed therebetween. The spindle is typically rotatably supported relative to the outer race and includes a flange which receives lug bolt mounting studs for securing a vehicle wheel to the spindle for rotation therewith. The wheel speed sensor assembly typically includes a wheel speed sensor secured to the non-rotatable outer race, and a target wheel secured to inner race for rotation therewith. As is well know, during vehicle operation the target wheel sends a signal to the wheel speed sensor indicating the rotational speed of the associated vehicle wheel, and the wheel speed sensor transmits a signal to a controller corresponding to the rotational speed of the vehicle wheel.

SUMMARY OF THE INVENTION

This invention relates to a wheel speed sensor assembly adapted for use in a wheel end assembly of a vehicle. The wheel speed sensor and bearing assembly includes an outer race, an inner race, a bearing unit, a spindle, a wheel speed sensor and a tone wheel. The outer race includes an opened inboard end, an opened outboard end, and at least one bearing seat. The inner race includes at least one bearing seat. The bearing unit is disposed between the bearing seats of the outer race and inner race. The spindle is adapted to be secured to a fixed component of the vehicle and includes an inboard end, an outboard end, and an opening formed therethrough. The wheel speed sensor is operatively connected to the spindle adjacent the outboard end thereof. The wheel speed sensor includes an outer magnet surface. The tone wheel is operatively secured to the outer race adjacent the opened outboard end thereof. The tone wheel includes an inner surface which is positioned in a spaced apart relationship relative to the outer magnet surface of the wheel speed sensor.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
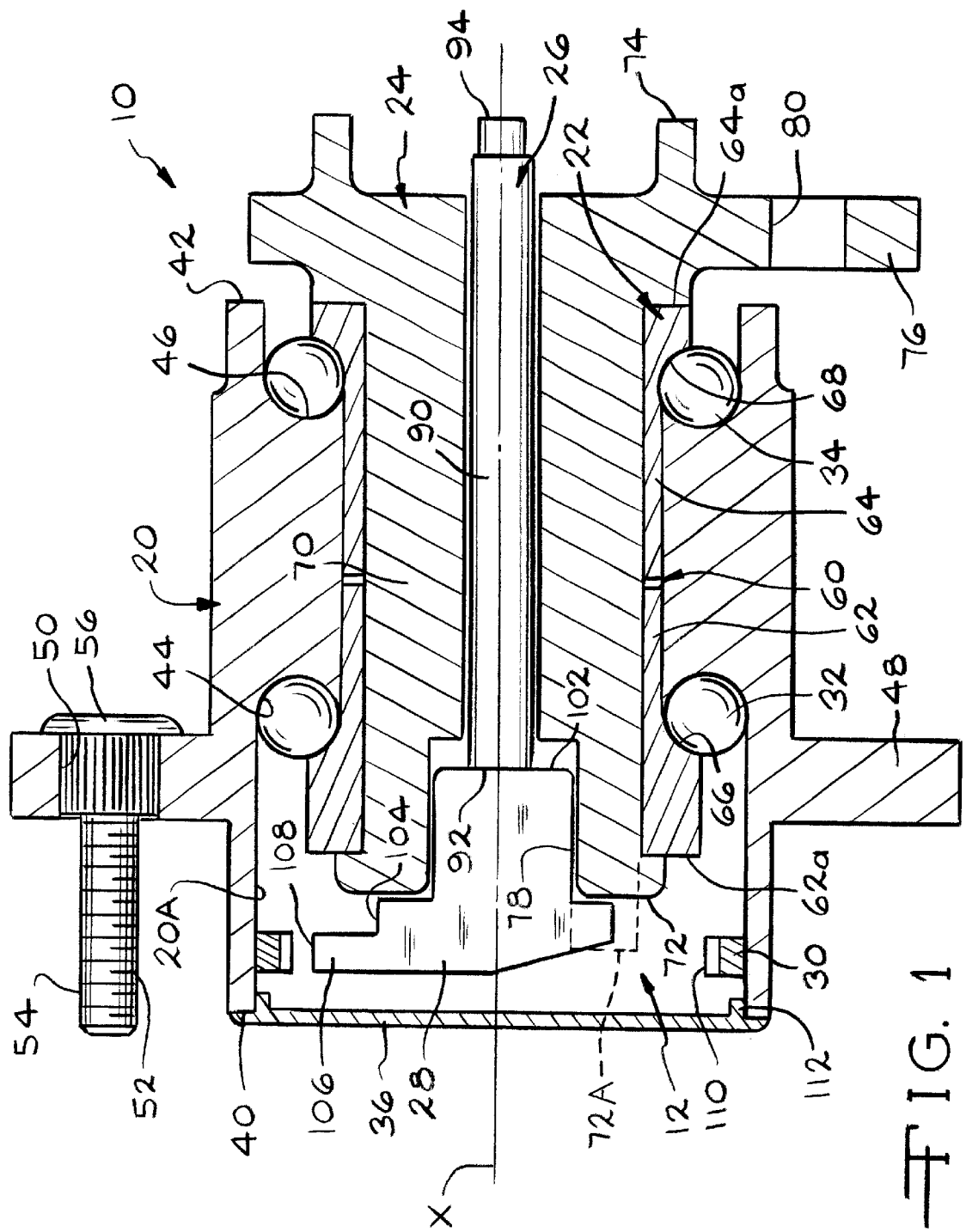
FIG. 1 is a sectional view of portion of a vehicle wheel end assembly including a first embodiment of a wheel speed sensor assembly in accordance with the present invention.

Referring to FIG. 1, there is illustrated a portion of a vehicle wheel end assembly, indicated generally at 10, including a first embodiment of a wheel speed sensor assembly, indicated generally at 12, in accordance with the present invention is illustrated. The wheel end assembly 10 is associated with a front wheel non-drive vehicle or a rear wheel non-drive vehicle. The general structure and operation of the wheel end assembly 10 is conventional in the art. Thus, only those portions of the wheel end assembly 10 which are necessary for a full understanding of this invention will be explained and illustrated in detail. Although this invention will be described and illustrated in conjunction with the particular vehicle wheel end assembly 10 disclosed herein, it will be appreciated that this invention may be used in conjunction with other kinds of wheel end assemblies.

The wheel end assembly 10 defines an axis X and includes an outer race 20, an inner race 22, a spindle 24, a connector 26, a wheel speed sensor 28, a target or tone wheel 30, ball bearings 32 and 34, and a cover 36. The outer race 20 includes a generally opened outer end 40, a generally opened inner end 42, a first bearing seat 44, a second bearing seat 46, and a generally radially extending flange 48. The outer race 20 is preferably formed from suitable bearing grade steel. The flange 48 includes a plurality of non-threaded lug bolt receiving holes 50 formed therethrough (only one of the lug bolt receiving holes 50 being illustrated), equally spaced circumferentially about the flange 48. A lug bolt 52 having a threaded outer end 54 and an enlarged head 56 is disposed in each of the lug bolt receiving holes 50 for mounting a vehicle wheel (not shown) on the wheel end assembly 10. A threaded lug nut (not shown) is installed on the threaded outer end 54 of each lug bolt 50 and tightened to secure the vehicle wheel to the wheel end assembly 10. Alternatively, the construction of the outer race 20 of the wheel end assembly 10 can be other than illustrated if so desired.

In the illustrated embodiment, the inner race 22 defines a generally axially extending body 60 and includes an outboard portion 62 and an inboard portion 64. The outboard portion 62 defines an outboard or first end 62A, and the inboard portion 64 defines an inboard or second end 64. The inner race 22 includes a first bearing seat 66 formed near the outboard end 62, and a second bearing seat 68 formed near the inboard end 64 thereof. The inner race 22 is preferably formed from suitable bearing grade steel. Alternatively, a portion of the inner race 22 can be formed as part of the spindle 24.

The bearings 32 and 34 are illustrated as being ball bearings. The bearing 32 is disposed between the respective bearing seats 44 and 66 of the outer race 20 and the inner race 22. Similarly, the bearing 34 is disposed between the respective bearing seats 46 and 68 of the outer race 20 and the inner race 22. Alternatively, the bearings 32 and 34 can be other than illustrated if so desired. For example, the bearings 32 and 34 can be tapered roller bearings.

The spindle 24 includes an axially extending body 70 having an outboard end 72, an inboard end 74, and a generally radially extending flange 76. In the illustrated embodiment, the outboard end 74 is originally as shown in phantom at 74A, and is subjected to a suitable metal forming process to form it over and against the adjacent outboard end 62 of the inner race 22. Such a suitable metal forming process can include a roll forming process or a spin forming process. The outboard end 72 further includes a recess 78 formed therein for a purpose to be discussed below. The spindle 24 is preferably formed from steel. Alternatively, the spindle 24 can be formed from other materials, such as for example, from cast iron. Also, the spindle 24 can be retained other than illustrated if so desired. For example, the spindle 24 could be retained by a nut (not shown) threadably installed on a threaded end (not shown) of the spindle or by other suitable fastening members. Also, when a portion of the inner race 22 is formed as part of the spindle 24 and a nut is used, the nut would be operative to secure and load the bearings.

The flange 76 of the spindle 24 includes a plurality of non-threaded mounting bolt receiving holes 80 formed therethrough (only one of the mounting bolt receiving holes 80 being illustrated), equally spaced circumferentially about the flange 76. A mounting bolt (not shown) having a threaded outer end is disposed in each of the mounting bolt receiving holes 80 for securing the spindle 24 to a suitable fixed component of the vehicle, such as for example, a steering knuckle flange (not shown) or an axle flange (not shown). Thus, the spindle 24 is non-rotatably secured to the fixed knuckle or axle flange of the vehicle and the outer race 20 is rotatably secured to the associated vehicle wheel for rotation therewith. Alternatively, the structure of the spindle 24 can be other than illustrated if so desired. For example, the spindle 24 could include an outer surface which is operative to define at least a part of the inner race for supporting the inboard bearing 34.

The connector 26 includes a body 90 having an outboard end 92 and an inboard end 94. In the illustrated embodiment, the outboard end 92 is formed integral with the wheel speed sensor 28 to define a one-piece unit. The inboard end 94 is adapted to be connected to a suitable wire harness member (not shown) member for providing a signal representative of the rotational speed of the vehicle wheel. The connector 26 is preferably formed from plastic. Alternatively, the connector 26 can be formed from other materials, such as for example, from stamped steel and various polymers. Also, the structure of the connector 26 can be other than illustrated if so desired. For example, the connector 26 and the wheel speed sensor 28 can be formed as separate components and operatively secured together by suitable means.

The wheel speed sensor 28 includes a body 100 having a reduced diameter inboard end 102, an increased diameter intermediate body section 104, and an outboard end 106 having an outer diameter 108 which defines a speed sensor magnet outer diameter 108. The inboard end 102 of the wheel speed sensor 28 is disposed in the recess 78 of the spindle 24 is an interference or press fit therewith. Preferably, the wheel speed sensor 28 is formed from plastic and, as discussed above, is formed integral with the connector 26 during a molding process. Alternatively, the structure of the wheel speed sensor 28 can be other than illustrated if so desired.

The tone wheel 30 is preferably formed from steel and is a generally annular member which is disposed in the outer race 20 near the opened outboard end 40 along an inner surface 20A of the outer race 20. To accomplish this, the tone wheel 30 is disposed at a predetermined position in the inner surface 20A of the outer race 20 in an interference fit therewith. The tone wheel 30 includes an inner diameter 110 which is positioned in a spaced apart relationship relative to the magnet outer diameter 108 of the wheel speed sensor 28. Alternatively, the structure of the tone wheel 30 can be other than illustrated if so desired.

The cover 36 is releasably attached to the opened outboard end 40 of the outer race 20 by suitable means. For example, in the illustrated embodiment the cover 36 is provided with a plurality of axially extending projections 112 which are adapted to frictionally engage the surface 20A of the outer race 20 to releasably attach the cover 36 thereon. The cover 36 is formed from a suitable material, such as for example, steel, aluminum, plastic or powdered metal. Alternatively, the structure of the cover 36 can be other than illustrated if so desired.

Figure 2:
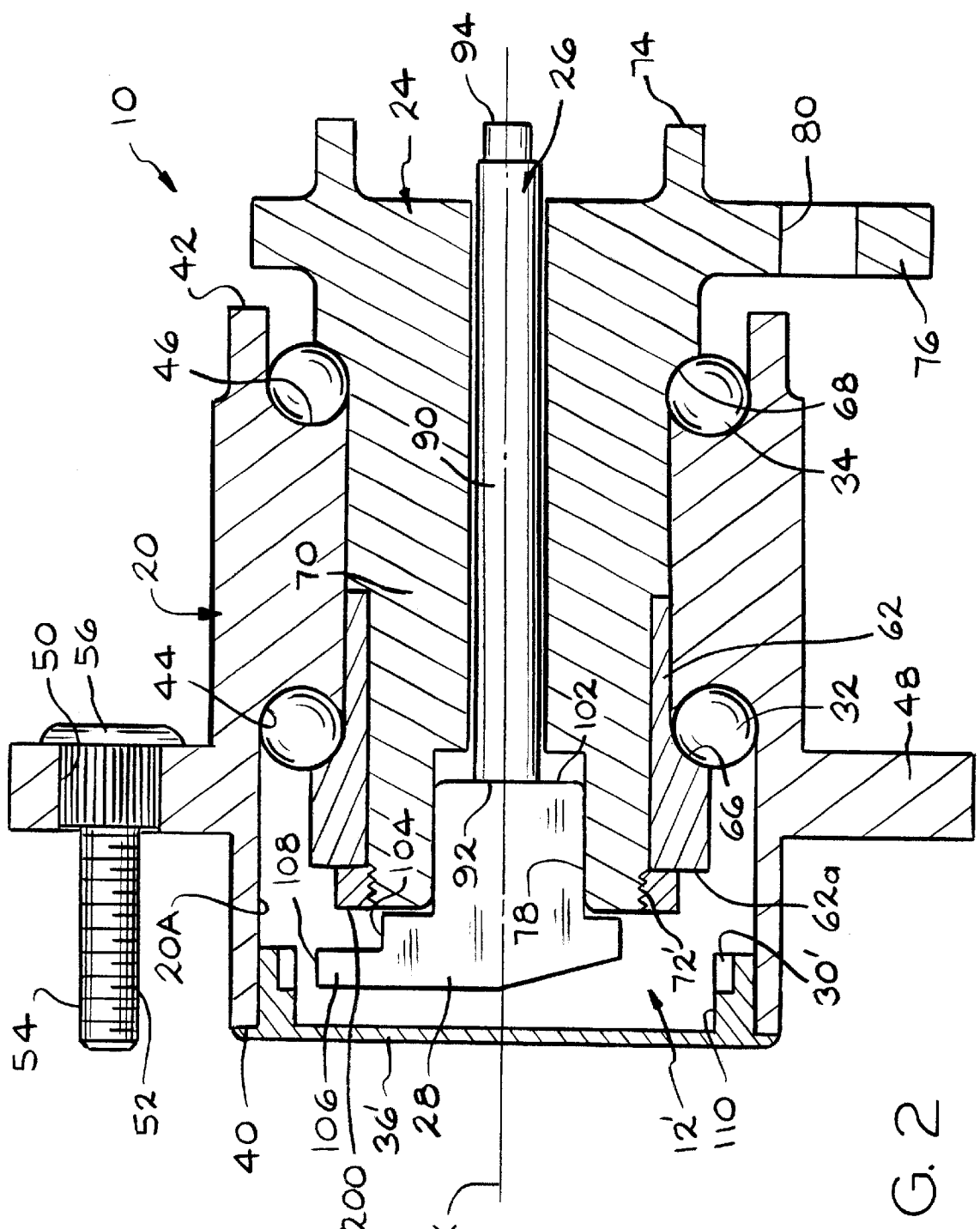
FIG. 2 is a sectional view of portion of a vehicle wheel end assembly including a second embodiment of a wheel speed sensor assembly in accordance with the present invention.

Turning now to FIG. 2 and using like reference numbers for corresponding parts, there is illustrated a vehicle wheel end assembly, indicated generally at 10', including a second embodiment of a wheel speed sensor assembly, indicated generally at 12', in accordance with the present invention. In this embodiment, a cover 36' includes an integral tone wheel 30' which is adapted to frictionally engage the surface 20A of the outer race 20 to releasably attach the cover 36' thereon. Also, a spindle 24' includes an integrally formed inner race portion for inboard bearing 34. In addition, a nut 200 is installed on a threaded end 72' of the spindle 24' to secure and load the bearings thereon.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A wheel speed sensor and bearing assembly adapted for use in a wheel end assembly of a vehicle comprising:
   an outer race defining an axis and adapted to be secured to a rotatable component of the vehicle, said outer race including an opened inboard end, an opened outboard end, and at least one bearing seat;
   an inner race including at least one bearing seat;
   a bearing unit including at least one bearing disposed between said bearing seats of said outer race and said inner race;
   a spindle adapted to be secured to a fixed component of the vehicle, said spindle including an inboard end, an outboard end, and an opening formed therethrough extending from said inboard end to said outboard end;
   a wheel speed sensor directly secured to said spindle adjacent said outboard end thereof, said wheel speed sensor including an outer magnet surface; and
   a tone wheel operatively secured to said outer race adjacent said opened outboard end thereof, said tone wheel including an inner surface which is positioned in a spaced apart relationship relative to said outer magnet surface of said wheel speed sensor.

2. The wheel speed sensor and bearing assembly defined in claim 1 wherein said outer race includes a generally radially extending flange, said flange including a plurality of lug bolt receiving holes formed therethrough, said lug bolt receiving holes adapted to receive a lug bolt for mounting a vehicle wheel on the wheel end assembly.

3. The wheel speed sensor and bearing assembly defined in claim 1 wherein said spindle forms a portion of said inner race.

4. The wheel speed sensor and bearing assembly defined in claim 1 wherein said bearing unit includes a pair of bearings.

5. The wheel speed sensor and bearing assembly defined in claim 1 wherein said spindle includes a generally radially extending flange, said flange including a plurality of mounting bolt receiving holes formed therethrough, said mounting bolt receiving holes adapted to receive a mounting bolt for securing said spindle to the fixed component of the vehicle.

6. The wheel speed sensor and bearing assembly defined in claim 1 wherein said outboard end of said spindle is subjected to a metal forming process to form it over and against an adjacent outboard end surface of said inner race.

7. The wheel speed sensor and bearing assembly defined in claim 1 wherein said outboard end of said spindle is threaded and adapted to receive a threaded nut thereon to secure and load the bearing unit.

8. The wheel speed sensor and bearing assembly defined in claim 1 wherein said outboard end of said spindle includes a recess formed therein, said recess adapted to receive a body portion of said wheel speed sensor.

9. The wheel speed sensor and bearing assembly defined in claim 1 further including a connector disposed in said opening of said spindle, said connector having an outboard end and an inboard end, said outboard end of said connector operatively connected to said wheel speed sensor and said inboard end adapted to be connected to a member for providing a signal representative of the rotational speed of the vehicle wheel to a controller.

10. The wheel speed sensor and bearing assembly defined in claim 9 wherein said wheel speed sensor and said connector are formed as an integral one piece unit.

11. The wheel speed sensor and bearing assembly defined in claim 1 further including a cover attached to said opened outboard end of said outer race.

12. The wheel speed sensor and bearing assembly defined in claim 11 wherein said tone wheel is formed as part of said cover.

13. A wheel speed sensor and bearing assembly adapted for use in a wheel end assembly of a vehicle comprising:
   an outer race defining an axis and adapted to be secured to a rotatable component of the vehicle, said outer race including an opened inboard end, an opened outboard end, and at least one bearing seat;
   an inner race including at least one bearing seat;
   a bearing unit including at least one bearing disposed between said bearing seats of said outer race and said inner race;
   a spindle adapted to be secured to a fixed component of the vehicle, said spindle including an inboard end, an outboard end having a recess formed therein, and an opening formed therethrough extending from said inboard end to said outboard end;
   a wheel speed sensor disposed in said recess of said spindle to thereby directly secure said wheel speed sensor to said spindle, said wheel speed sensor including an outer magnet surface;
   a cover attached to said opened outboard end of said outer race; and
   a tone wheel formed as part of said cover and operatively secured to said outer race adjacent said opened outboard end thereof, said tone wheel including an inner surface which is positioned in a spaced apart relationship relative to said outer magnet surface of said wheel speed sensor.

14. The wheel speed sensor and bearing assembly defined in claim 13 wherein said spindle forms a portion of said inner race.

15. The wheel speed sensor and bearing assembly defined in claim 13 wherein said outboard end of said spindle is subjected to a metal forming process to form it over and against an adjacent outboard end surface of said inner race.

16. The wheel speed sensor and bearing assembly defined in claim 13 wherein said outboard end of said spindle is threaded and adapted to receive a threaded nut thereon to secure and load the bearing unit.

17. The wheel speed sensor and bearing assembly defined in claim 13 further including a connector disposed in said opening of said spindle, said connector having an outboard end and an inboard end, said outboard end of said connector operatively connected to said wheel speed sensor and said inboard end adapted to be connected to a member for providing a signal representative of the rotational speed of the vehicle wheel to a controller.

18. The wheel speed sensor and bearing assembly defined in claim 17 wherein said wheel speed sensor and said connector are formed as an integral one piece unit.

19. A wheel speed sensor and bearing assembly adapted for use in a wheel end assembly of a vehicle comprising:
   an outer race defining an axis and adapted to be secured to a rotatable component of the vehicle, said outer race including an opened inboard end, an opened outboard end, and at least one bearing seat;
   an inner race including an outboard bearing seat and an inboard bearing seat;
   a bearing unit including at least one bearing disposed between said bearing seats of said outer race and said inner race;
   a spindle adapted to be secured to a fixed component of the vehicle, said spindle including an inboard end, an outboard end, and an opening formed therethrough extending from said inboard end to said outboard end, said spindle defining said inboard bearing seat of said inner race;
   a wheel speed sensor directly secured to said spindle adjacent said outboard end thereof, said wheel speed sensor including an outer magnet surface;
   a tone wheel operatively secured to said outer race adjacent said opened outboard end thereof, said tone wheel including an inner surface which is positioned in a spaced apart relationship relative to said outer magnet surface of said wheel speed sensor; and
   a cover attached to said opened outboard end of said outer race.

20. The wheel speed sensor defined in claim 19 wherein said tone wheel is formed as part of said cover.

* * * * *